United States Patent
Tripodi et al.

(10) Patent No.: US 11,157,575 B2
(45) Date of Patent: Oct. 26, 2021

(54) DETERMINING A VERIDICALITY METRIC OF A USER PROFILE STORED IN AN ELECTRONIC INFORMATION SYSTEM

(71) Applicant: INTERNATIONAL BUSINESS MACHINES CORPORATION, Armonk, NY (US)

(72) Inventors: Viviana Tripodi, Rome (IT); Alessandro Donatelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 15/872,300

(22) Filed: Jan. 16, 2018

(65) Prior Publication Data
US 2019/0220545 A1    Jul. 18, 2019

(51) Int. Cl.
*G06F 15/16*  (2006.01)
*G06F 16/9535* (2019.01)
*G06Q 50/00*  (2012.01)

(52) U.S. Cl.
CPC ......... *G06F 16/9535* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 8,752,170 B1 | 6/2014 | Newstadt et al. | |
| 8,812,690 B1 | 8/2014 | Ramesh et al. | |
| 9,332,031 B1* | 5/2016 | Kappiah | G06F 17/40 |
| 9,448,704 B1* | 9/2016 | Belhumeur | G06F 3/0481 |
| 9,648,031 B2 | 5/2017 | Kadashevich et al. | |
| 2010/0122347 A1* | 5/2010 | Nadler | G06Q 10/10 726/26 |
| 2010/0217743 A1* | 8/2010 | Ueki | A61B 5/1176 706/52 |
| 2010/0250676 A1 | 9/2010 | Ufford et al. | |
| 2013/0013489 A1* | 1/2013 | Kremen | G06Q 40/025 705/38 |
| 2014/0156750 A1 | 6/2014 | De Cristofaro et al. | |
| 2014/0282977 A1 | 9/2014 | Madhu et al. | |
| 2015/0128222 A1 | 5/2015 | Festa et al. | |

(Continued)

OTHER PUBLICATIONS

Find date I registered on Facebook, 2011, pp. 1-3.*

(Continued)

*Primary Examiner* — Alex Gofman
(74) *Attorney, Agent, or Firm* — Dmitry Paskalov

(57) ABSTRACT

Embodiments of the present invention disclose a method, computer program product, and system for determining a veridicality metric of a user profile stored in an electronic information system. The method, computer program product and computer system may include a computing device that inputs an identifier of a user profile and retrieves from an information system at least one element of the user profile based on the identifier. The computing device may submit a search request to at least one further information system. The search request may include a search criterion with at least a part of the element. The computing device may receive at least one search result related to the search request, and determine the veridicality metric based on the at least one element and the at least one search result.

18 Claims, 11 Drawing Sheets

(56) References Cited

U.S. PATENT DOCUMENTS

| | | | |
|---|---|---|---|
| 2015/0142823 A1* | 5/2015 | Klawitter | G06Q 50/01 |
| | | | 707/748 |
| 2016/0005050 A1* | 1/2016 | Teman | G06Q 30/018 |
| | | | 705/317 |
| 2016/0048549 A1 | 2/2016 | Patterson et al. | |
| 2016/0188713 A1* | 6/2016 | Green | G06F 16/38 |
| | | | 707/738 |
| 2017/0214646 A1* | 7/2017 | Longo | H04L 51/20 |
| 2018/0174190 A1* | 6/2018 | Ferreira | G06Q 30/0264 |
| 2018/0253499 A1* | 9/2018 | Arrowood | G06F 16/9535 |

OTHER PUBLICATIONS

Mell et al., "The NIST Definition of Cloud Computing", Recommendations of the National Institute of Standards and Technology, NIST Special Publication 800-145, Sep. 2011, 7 pages.

Pentel, "Automatic Age Detection Using Text Readability Features", Jan. 2015, 6 pages.

Schwartz et al., "Personality, Gender, and Age in the Language of Social Media: The Open-Vocabulary Approach", PLoS ONE, vol. 8, Issue: 9, e73791, Published: Sep. 25, 2013, pp. 1-16.

Tolentino, "Are your users who they say they are? How do you know?", Mar. 30, 2015, Future of Communications, pp. 1-8.

Torky et al., "Recognizing Fake Identities in Online Social Networks Based on a Finite Automaton Approach", 2016 12th International Computer Engineering Conference (ICENCO), Dec. 28-29, 2016, IEEE, pp. 1-7.

Xiao et al., "Detecting Clusters of Fake Accounts in Online Social Networks", AISec'15, Oct. 16, 2015, 11 pages.

* cited by examiner

DETERMINING A VERIDICALITY METRIC OF A USER PROFILE STORED IN AN ELECTRONIC INFORMATION SYSTEM

BACKGROUND

The present invention relates in general to data processing systems, and more particularly to a method and a system for determining a veridicality metric of a user profile stored in an electronic information system.

With the spread of social networks, it has become quite common to connect to new people through these networks without personally knowing someone. This often happens by connecting with friends of friends on social platforms or connecting with someone through a blog, thematic channel, forum, website, etc.

The question then arises if the person behind a social identity can be trusted. Without personally knowing someone, it is difficult, if not impossible, to verify if someone is who they say they are and if any information they provide is real. Trust is usually based on a common network. If a person is a friend of a direct peer in a social network, one is inclined to think that the direct friend knows this person and so the person can be trusted. Unfortunately, quite often, people accept connections from strangers resulting in connections where one has no idea who the other person really is.

For example, online dating facilitates connections between strangers without any physical interaction required. However, many users may be hesitant to participate in online dating services or share information about themselves with others via written communication due to security concerns. Thus, people may be inclined to enter false or misleading information in their online profile. Certifying information provided by participants of online dating services can ease a user's concerns that the information provided by another person is truthful. For Example, there are currently methods of certifying information provided in dating profiles by comparing that metadata of the information provided on the dating profile to metadata on other social networking profiles of the same person. If the metadata matches, a certified status may be assigned to the metadata on the dating profile.

BRIEF SUMMARY

Embodiments of the present invention disclose a method, computer program product, and system for determining a veridicality metric of a user profile stored in an electronic information system. The method, computer program product and computer system may include a computing device that inputs an identifier of a user profile and retrieves from an information system at least one element of the user profile based on the identifier. The computing device may submit a search request to at least one further information system. The search request may include a search criterion with at least a part of the element. The computing device may receive at least one search result related to the search request, and determine the veridicality metric based on the at least one element and the at least one search result.

BRIEF DESCRIPTION OF THE DRAWINGS

The present invention together with the above-mentioned and other objects and advantages may best be understood from the following detailed description of the embodiments, but not restricted to the embodiments.

DETAILED DESCRIPTION

Figure 1:
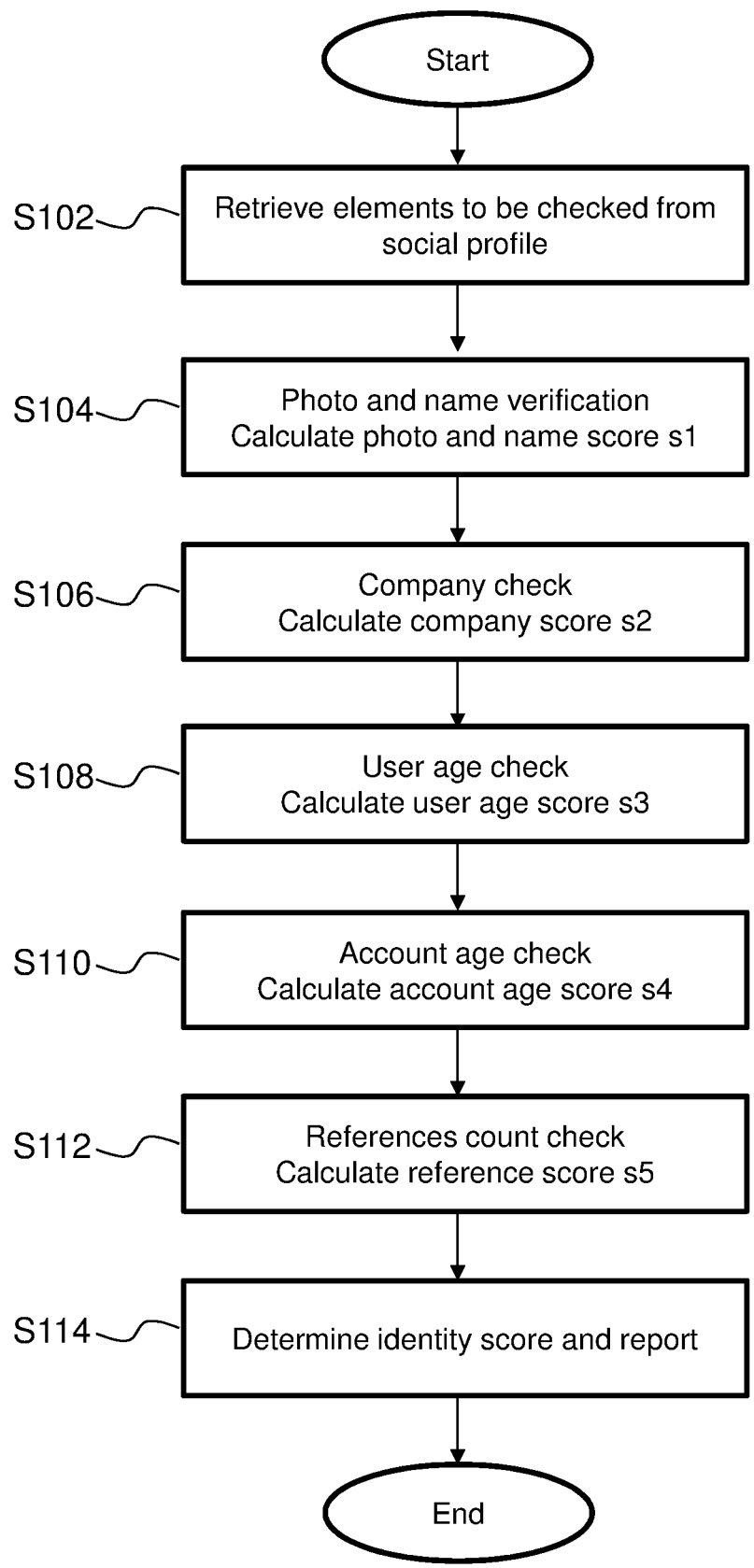
FIG. 1 depicts a block diagram illustrating the steps followed to determine an identity score according to an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The illustrative embodiments described herein provide a method for determining a veridicality metric of a user profile, i.e. a user account, stored in an electronic information system. The illustrative embodiments may be used for the method for (i) inputting an identifier of the user profile; (ii) retrieving from the information system at least one element of the user profile based on the identifier; (iii) submitting a search request to at least one further information system, a search criterion of the search request comprising at least a part of the element; (iv) receiving at least one search result related to the search request; and (v) determining the veridicality metric based on the at least one element and the at least one search result.

As used herein, the electronic information system may be a social media platform and the user profile may be a social media profile or social media account.

According to the inventive method it can be determined how truthful the characteristics listed by a person on a social media platform of are.

Given a set of data available in the user profile, such as, but not limited to, a photo, a first name, a surname, a date of birth/age, a gender, a city of birth, an address, a phone number, a company name, etc., a user profile may be assessed to determine if the user data us real and if the person behind the user profile is not lying.

In order to verify if the data given by a person on a public profile is real, the proposed solution checks and compares available public data associated to the social identity to obtain a reliability score.

Due to the proposed method for determining a veridicality metric of a user profile stored in an electronic information system it is not necessary to access private databases to check data of the user profile. Further there is no need to leverage user credentials to verify social network data. Advantageously, real-world acquaintances are not queried. The identity behind the user profile is not verified using a third party, e.g. a service company, that may provide a public key infrastructure to verify the identity of peers.

FIG. 1 depicts a flowchart illustrating the steps of a method followed to determine an identity score according to an embodiment of the invention.

If a new connection, such as, but not limited to, a friend, a colleague, an acquaintance, or an unknown connection, etc., on a social network is to be verified, the application analyzes the published information provided on the social network, e.g. Facebook® (FACEBOOK is a registered trademark of Facebook, Inc.), to determine a list of elements, i.e. published information, that can be used for verification. The list of elements might be dependent on the specific social network and be slightly different from platform to platform.

If an expected element is found in the user profile then it is assigned a score. If the element is also verified a further score is assigned. Scores of each item are added to obtain an overall score for the user profile.

After the list of expected elements has been checked, other elements are taken into account such as, but not limited to, the account age (when the account was created), the number of friends/contacts/direct peers, and the activity history (posted content in the timeline, comments/likes to other users' posts). A score for these items a score may also be assigned.

Given a user profile, a set of elements are searched for in the user profile. If no data has been published in the user profile or the application does not find expected elements, the score for each item may be zero, where zero is the lowest score that can be assigned.

On the contrary, if one or more elements are found in the user profile, the application checks each of them. For each element a score is assigned depending on the result of the verification.

A final reliability score will be assigned to the social network user based on the combination of obtained scores. Each element score might be weighted with a predefined coefficient, which may be fixed for each element according to the importance of each element.

Finally, a report is created to show the reliability score result.

In FIG. 1 the different steps of the verification are depicted. In step S102, respective elements to be checked are retrieved from the user profile in the electronic information system. At step S104 photo and name verification may be performed, if a photo and a name of the user profile being verified are available. A respective score, s1, for this element is determined. In step S106 a check of a given company name, if available is performed and a respective score, s2, for this element is determined. At step S108 the user age is checked, if available and a respective score, s3, for this element is determined. At S110, the age of the user profile in the information system is checked according to dates of the other elements in the user profile and a respective score, s4, for this element is determined. Referring to step S112, a count of references to the user profile in other accounts or information systems is determined and a respective score, s5, is calculated. Referring to step S114, a final report is created having a final reliability score will be assigned to the social network user based on the combination of obtained scores. Each element of the final reliability score might be weighted with a predefined coefficient, which may be fixed for each element according to the importance of each element.

Details of the different steps of the verification process are described in the following FIGS. 2 to 7.

Figure 2:
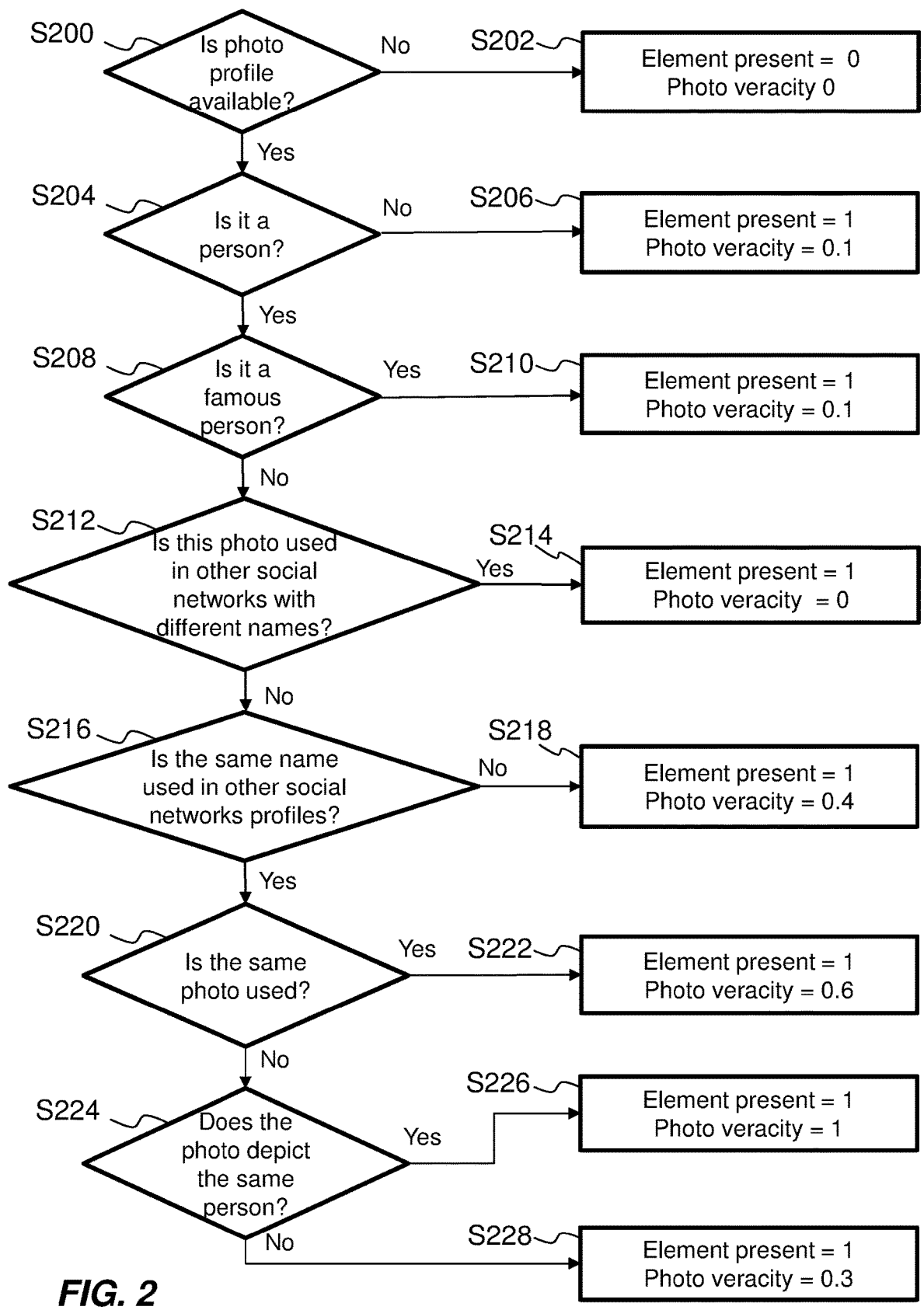
FIG. 2 depicts a flow chart for verifying a photo profile linked to a user name according to an embodiment of the invention.

FIG. 2 depicts a flow chart for verifying a photo in a user profile linked to a user name according to an embodiment of the invention.

A photo and name score may be determined by the equation: Photo and name score='element present'×'photo veracity', where 'item present' indicates if a photo is available in the social profile; its value is either zero or one, and 'photo veracity' indicates the degree to which the photo is evaluated on a decimal scale from 0 to 1.

As depicted in FIG. 2, referring to step S200, it is checked if a photo profile is available. If there is no such element available, the respective score is assigned a value of zero and the photo veracity is assigned a value of zero at step S202. If a photo profile is present the respective score is assigned a value one.

If a profile photo is available, it is checked at step S204 to determine if the profile photo is a photo of a person or something else, e.g. a drawing, a cartoon, a photo of a landscape, a photo of a group of people, etc. To understand image content, the picture may be classified through visual recognition software such as, but not limited to, IBM® Watson™ (IBM is a registered trademark of International Business Machines, Corp.; WATSON is a trademark of International Business Machines, Corp.), that analyzes images for scenes, objects, faces, text, and other subjects to provide insights into the visual content.

If the photo profile is not a photo of a person, this item is discarded from further verification at step S206 and the element present is scored with a value of one and the photo veracity is assigned a value of 0.1, for example.

If a photo of a person is available, it may be used as a reference for verification.

Referring to step S208, the photo is searched on the web to determine if it is a photo of someone else, such as, but not limited to, a famous person of the past or the present times or a stolen picture, etc.

If the picture depicts a famous person then it is assigned a value at step S210 with a low photo veracity, such as 0.1, and the following step S212 is not performed.

To understand if a photo represents a famous person it may be searched in an online encyclopedia, web news, etc. Moreover, the occurrences of the photo give an idea of the popularity of the person. If many results are found for the photo, with many meaning, for example, more results than a predefined threshold, then the represented person in the profile photo will be determined to be a famous person.

If the picture is found but it does not depict a famous person, it is determined in step S212 if it is another person. If the photo is found in other social profiles/web pages/blogs with a different name/nickname it is classified as false at step S214 and given a photo veracity score of zero.

Similarly, other social networks and web pages are checked for the profile name at step S216.

If no other profile with the same first name and last name or nickname of the user is found, then it is scored in step S218 with a photo veracity of 0.4, for example.

If other profiles with the same name are found in other social platforms, then the photos are compared at step S220. If the same photo is used, a score of one is assigned to element present at step S222 with a photo veracity of 0.6, for example.

If a different photo is found but it can be determined at step S224 with a sufficient degree of accuracy that the photo depicts the same person, a score of one is assigned to the element present, i.e. the profile photo, at step S226 with a high photo veracity of 1.0, for example. Otherwise, at step S228, a score of one is assigned to the element present, i.e. the profile photo, with a photo veracity of 0.3, for example.

To determine if different photos depict the same person techniques of image recognition may be used.

Figure 3:
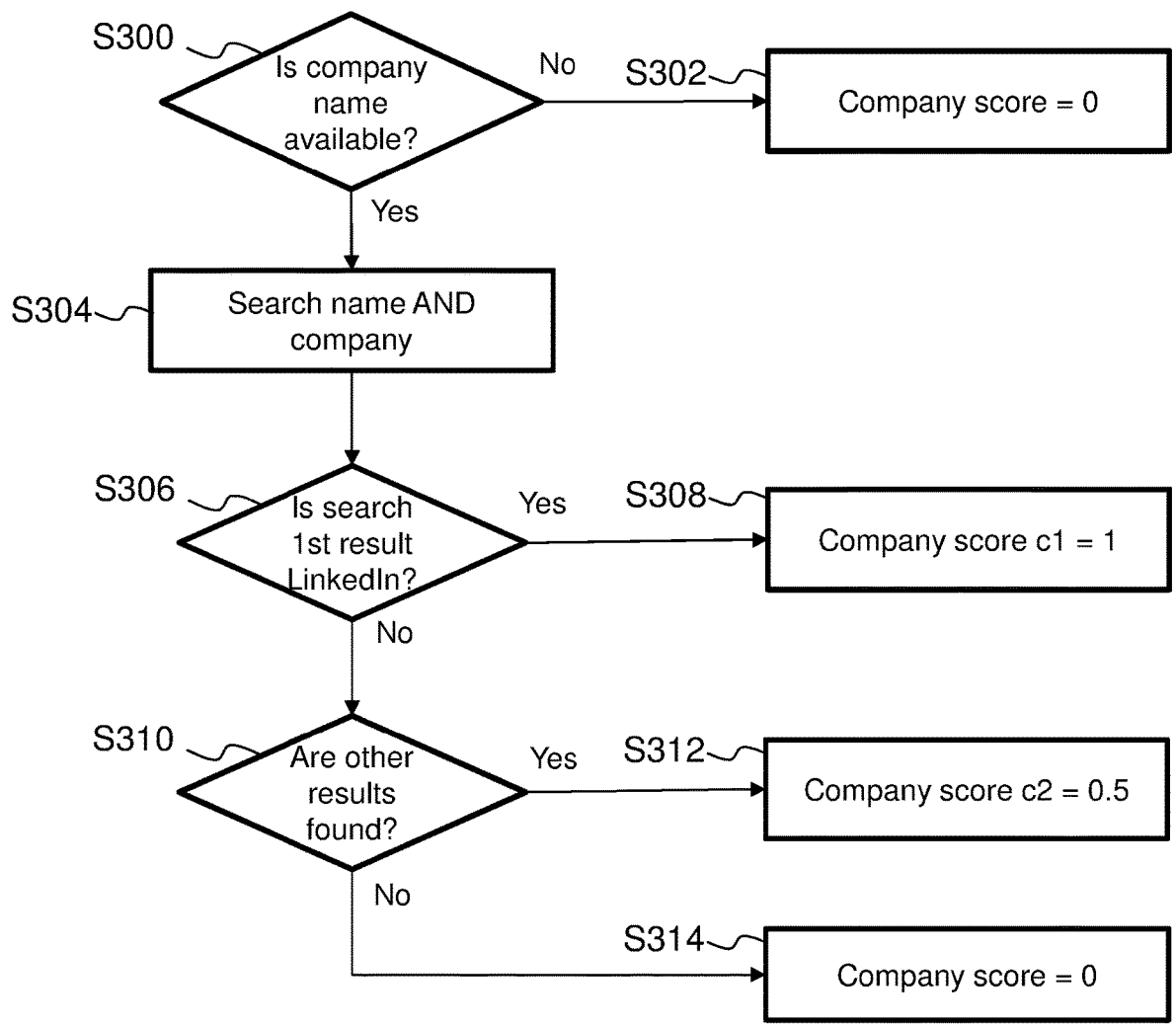
FIG. 3 depicts a flow chart for performing a company check according to an embodiment of the invention.

FIG. 3 depicts a flow chart for performing a company check according to an embodiment of the invention.

The company score is evaluated by taking into account a top professional network, such as but not limited to, LinkedIn® (LINKEDIN is a registered trademark of LinkedIn, Corp.) and other professional networks. In the following, c1 represents the score for a match with a top professional network and c2 the score for one or more matches with other professional networks.

The final company score is calculated according to (c1+c2)/1.5.

From a social profile it is often possible to see the company where the user of the profile works. For instance, in a Facebook® (FACEBOOK is a registered trademark of Facebook, Inc.) timeline, in the section named "In short", the company name can be easily retrieved. Therefore, at step S300 a company name is searched. If there is no company name available, a company score of zero is assigned at step S302.

Next the combination of user name and company name is searched at step S304.

If the company name is found in step S300 and combined with the user name in step S304, then it is searched in step S306, if there is a match in professional web pages and social networks. If a professional profile, such as LinkedIn® (LINKEDIN is a registered trademark of LinkedIn, Corp.) profile, is found the highest score of c1 equals to 1 in step S308 is assigned. It can be appreciated that any professional social network may be used.

If the search result in step S306 is negative, but other content is found at step S310, then the company score is assigned an incremental c2 score such as 0.5 at step S312. If no other content is found, then the company score is set to zero, for example, at step S314. The maximum value for the company score may be 1.

Figure 4:
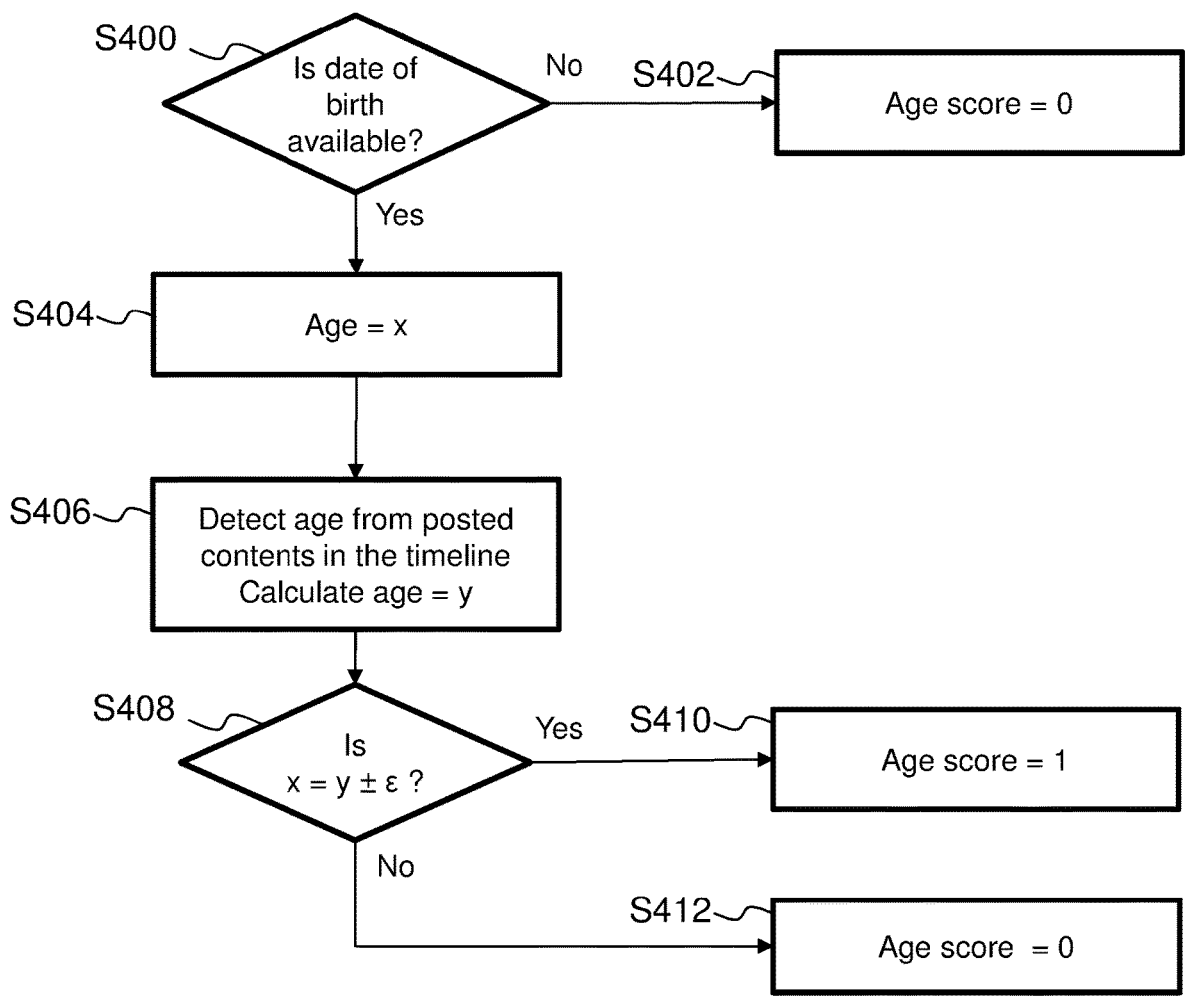
FIG. 4 depicts a flow chart for determining a user age according to an embodiment of the invention.

FIG. 4 depicts a flow chart for determining a user age according to an embodiment of the invention.

In a social platform, such as, but not limited to, Facebook® (FACEBOOK is a registered trademark of Facebook, Inc.), a user profile may provide personal information including the date of birth. If this piece of information is available at step S400 then it is used for further verification. The provided age may be assigned a value of "x" at step S404. If this information is not present an age score is assigned to zero at step S402.

The language used in posted contents can be analyzed to determine the user age at step S406. To perform this step some solutions are available such as, but not limited to, using Logistic Regression and Support Vector Machines algorithms on text readability features to construct classification models and using open-vocabulary analyses such as differential language analysis to analyze and correlate language features to age.

Data mining techniques may advantageously be used for verifying the age of the owner of the user profile.

The determined user age may be calculated to a value of y.

An error range E, may be established due to the accuracy of the method used to estimate the age. Referring to step S408, it is checked if x equals is found to be equal to y or is within error range of E. If x is found to be equal to y or within the error rage E, the user age is assigned a score of one at step S410. If the user age, x, does not equal y and is not within range E, it may be assigned an age score of zero at step S412.

A maximum value of one may be assigned to the age score.

Figure 5:
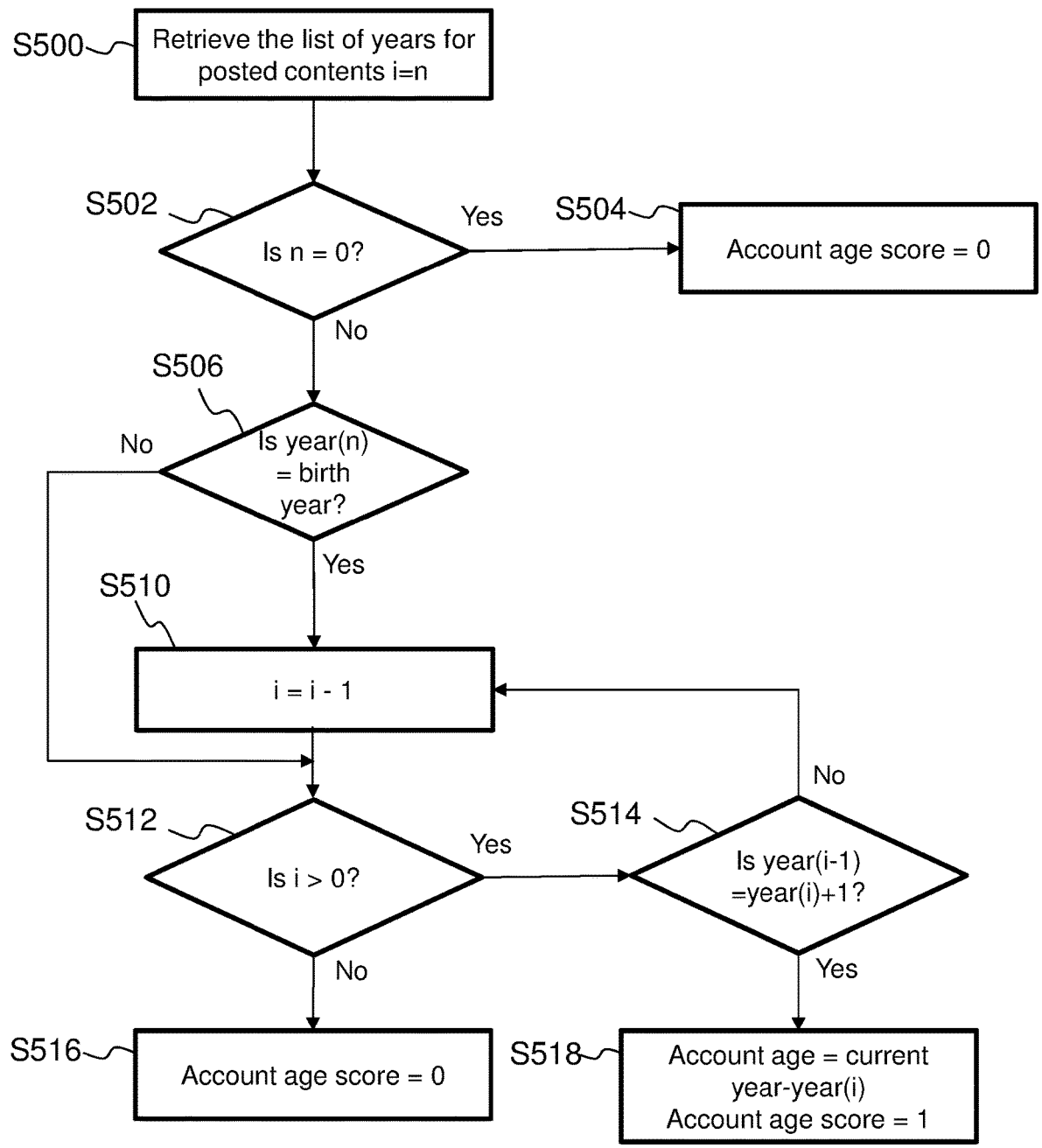
FIG. 5 depicts a flow chart for determining an account age according to an embodiment of the invention.

FIG. 5 depicts a flow chart for determining the age of an account, i.e. an age of the user profile, according to an embodiment of the invention.

In this phase, the dates, i.e. timestamps, of the content in a social profile are checked in order to establish the age of the account. For instance, in a Facebook® (FACEBOOK is a registered trademark of Facebook, Inc.) profile, if the posted content, i.e. the timeline, is scrolled, then a menu is displayed, which filters the content by year. Typically, the list is given in a form similar to the following sequence: 2016,2015,2014,2013,2012,2011,1996,1966.

Thus in step S500 the list of years, or timestamps, for posted content on a social media profile may be retrieved. A variable i may be set to n, which equals the number of items in the list of years. Next, it is checked if n equals to zero in step S502. If this is the case the account age score is assigned a value of zero at step S504.

Otherwise, the oldest year can be compared with the birth year in step S506 and then discarded if they match. This may be performed in step S510, where i is decremented by one.

As a standard user posts content every year, isolated years, i.e. years with no posted content, can be discarded as they probably represent a milestone in user's life. For example, Facebook® (FACEBOOK is a registered trademark of Facebook, Inc.) may list significant events in a user's life in a user's timeline, such as, but not limited to, birth year, graduation year, and marriage year, etc., even though the user profile was not active, or even in existence, during the year of the event.

Referring to step S512 it is checked if there are still items in the list, i.e. checking if i is greater than zero. If this is the case, at step S514 consecutive years in the list are checked. If this is not the case i is decremented once more at step S510. Once all items have been checked, the account age is calculated and a score is assigned to this element. Account age is calculated by taking the current year and subtracting the year of item i at step S518 and the account age score is assigned a value of one.

Hence, the oldest year in the consecutive sequence of years is probably the account creation date, so for the listed example above it would be 2011, with the years 1996 and 1966 being listed major life events before the creation of the account and outside the consecutive years of 2011-2016.

If i is not greater than zero at step S512, the account age score is set to a value of zero at step S516.

The older the account, the greater the chances are that the account is associated with a real person. This score could be weighted with the user age. Indeed, if the user is very young then the account cannot be more than a few years old.

This account age score has a value of zero or one, with one being the maximum value that can be assigned.

Figure 6:
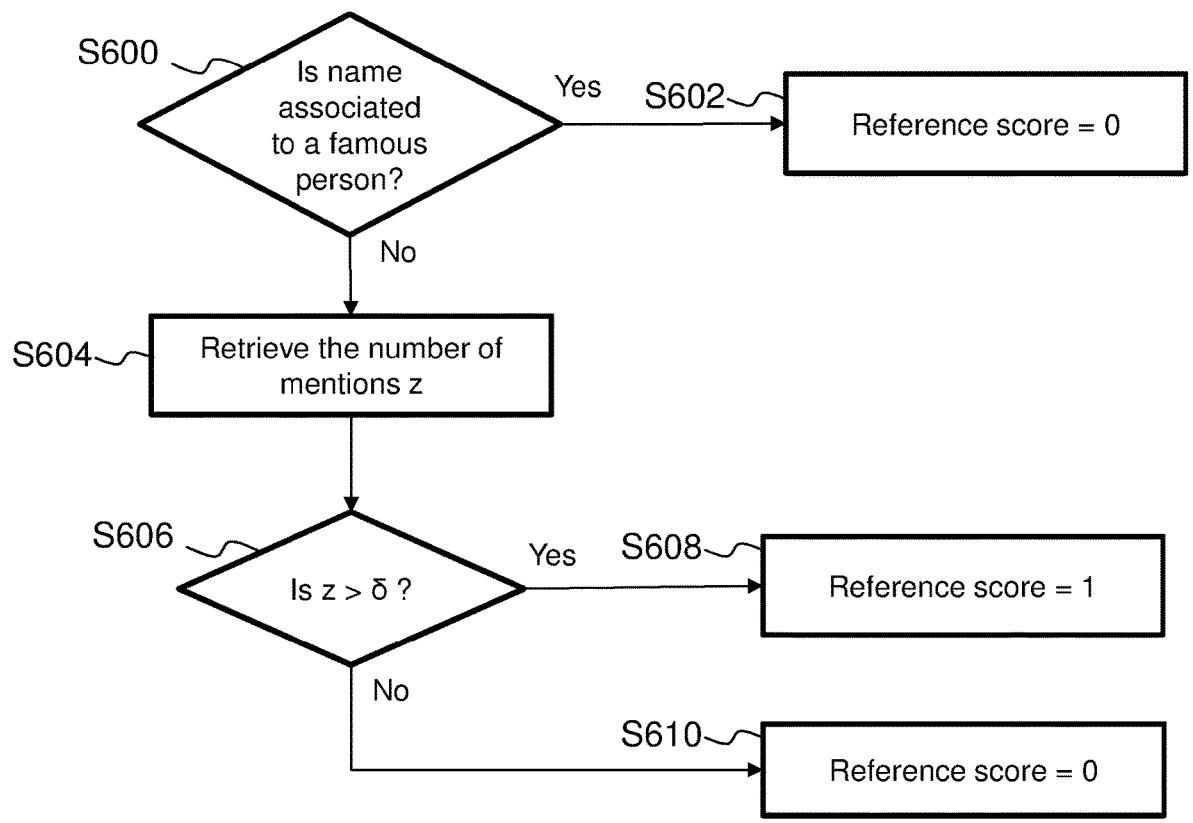
FIG. 6 depicts a flow chart for determining a reference count according to an embodiment of the invention.

FIG. 6 depicts a flow chart for determining a reference count according to an embodiment of the invention.

The reference count may be characterized by a number of documents stored in the information system that refer to the user profile. For example, the number of documents may be the number of posts by other social network users.

If the account under evaluation is mentioned in posts of other social network users, a score may be assigned. The more mentions that are found, the higher the assigned score. This verification step may not be performed if the profile photo or name has been classified as someone famous/known as described above. At step S600, the name is checked to see if it is associated with a famous person. If the name or profile photo is associated with a famous person, the reference score is assigned a value of zero at step S602.

If the name or profile photo is not associated with a famous person, a score is assigned to this item based on the number of found references. Therefore, in step S604 the number of mentions of the account in posts of other social network users, is retrieved. The number of mentions may represented by z.

Referring to step S606, it is checked if z exceeds a value δ, which may be set to given threshold. The reference score is calculated using a mathematical function that takes into account the number of found references above the threshold. Here a simplified way is shown to evaluate the reference score but other functions may be implemented. If the value of z exceeds a value δ the reference score is assigned to one in step S608, otherwise it is assigned to zero in step S610.

Figure 7:
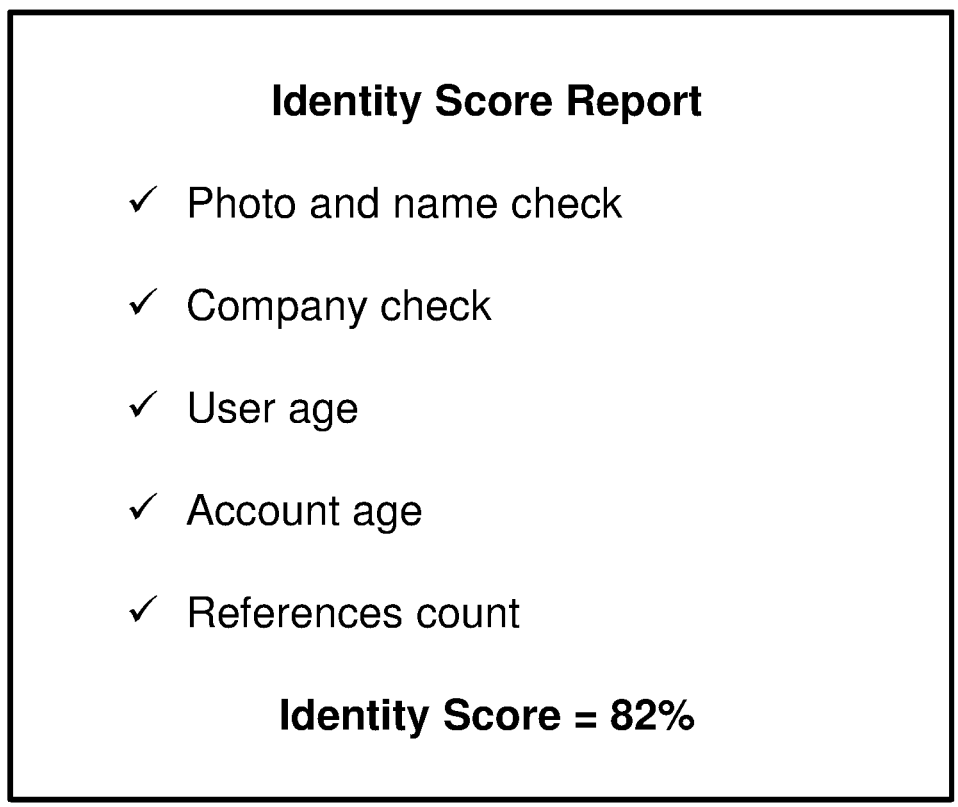
FIG. 7 depicts an identity score report according to an embodiment of the invention.

FIG. 7 depicts an identity score report 700 according to an embodiment of the invention.

Having performed the verification steps an identity score may be generated. This final score may be calculated summing the resulting score from each verification step using the equation: identity score (%)=(s1+s2+s3+s4+s5)/5×100, where s1=photo and name score; s2=company score; s3=user age score; s4=account age score; and s5=reference score.

The final reliability score may also be a combination, instead of a mere sum, of the resulting scores from the verification steps. Indeed, each element score may be weighted with a predefined coefficient, which may be fixed for each item according to the importance of each element for the specific embodiment.

An identity score report 700 is produced to show the final identity score. In FIG. 7 an example of the identity score report 700 is depicted with an identity score of 82%.

Thus determining the veridicality metric may comprise calculating at least one score value based on the at least one element of the user profile and the at least one search result.

Advantageously determining the veridicality metric may comprise calculating a weighted sum of the multiple score values, if more than one element is searched, wherein at least one score value is based on the at least one element of the user profile and the at least one search result. The score values of the different elements may be weighted with predefined coefficients attributed to one element each.

Figure 8:
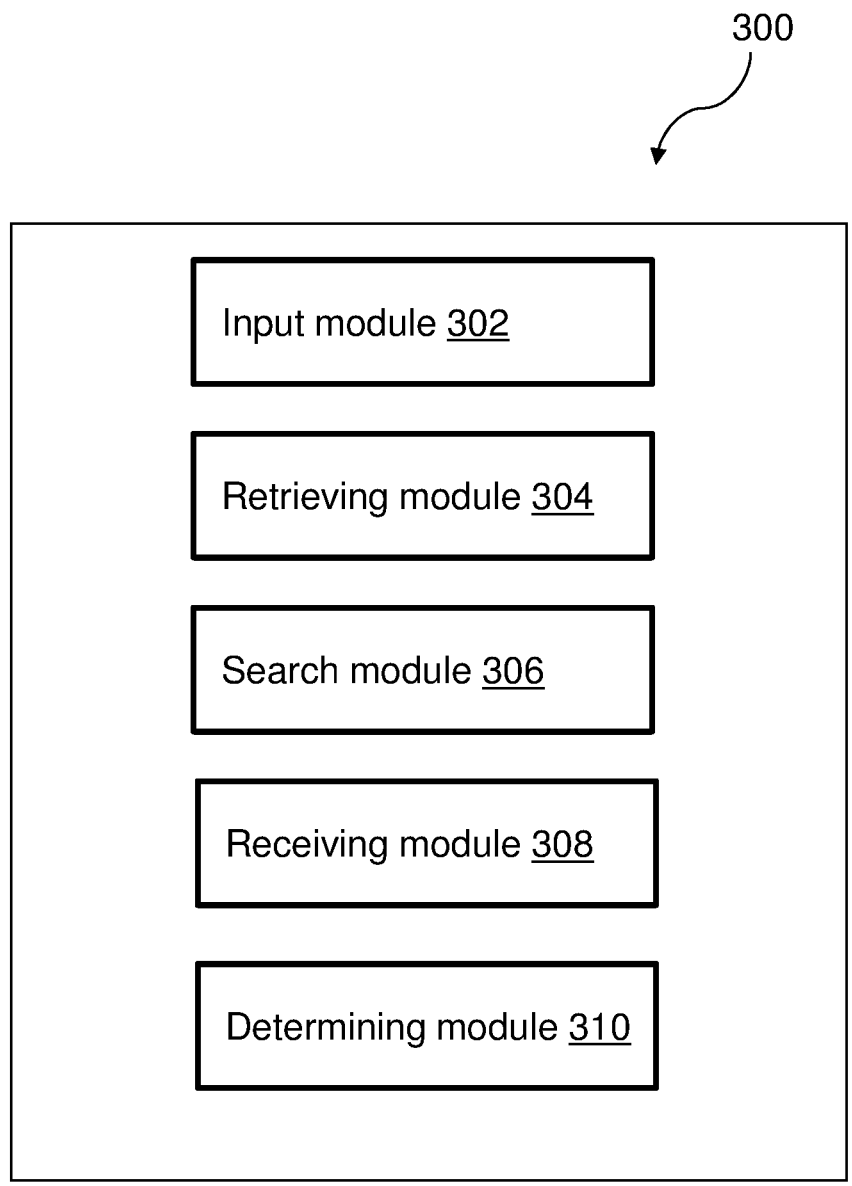
FIG. 8 depicts a system for determining a veridicality metric of a user profile stored in an electronic information system according to an embodiment of the invention.

FIG. 8 depicts a system 300, which may have input module 302, retrieving module 304, search module 306, receiving module 308, and determining module 310 for determining a veridicality metric of a user profile stored in an electronic information system according to an embodiment of the invention.

Input module 302 may be configured for receiving an identifier of the user profile. Retrieving module 304 may be configured for retrieving at least one element of the user profile based on the identifier from the information system. Search module 306 may be configured for submitting a search request to at least one further information system, a search criterion of the search request comprising at least a part of the element. Receiving module 308 may be configured for receiving at least one search result related to the search request. Determining module 310 may be configured for determining the veridicality metric based on the at least one element and the at least one search result.

Figure 9:
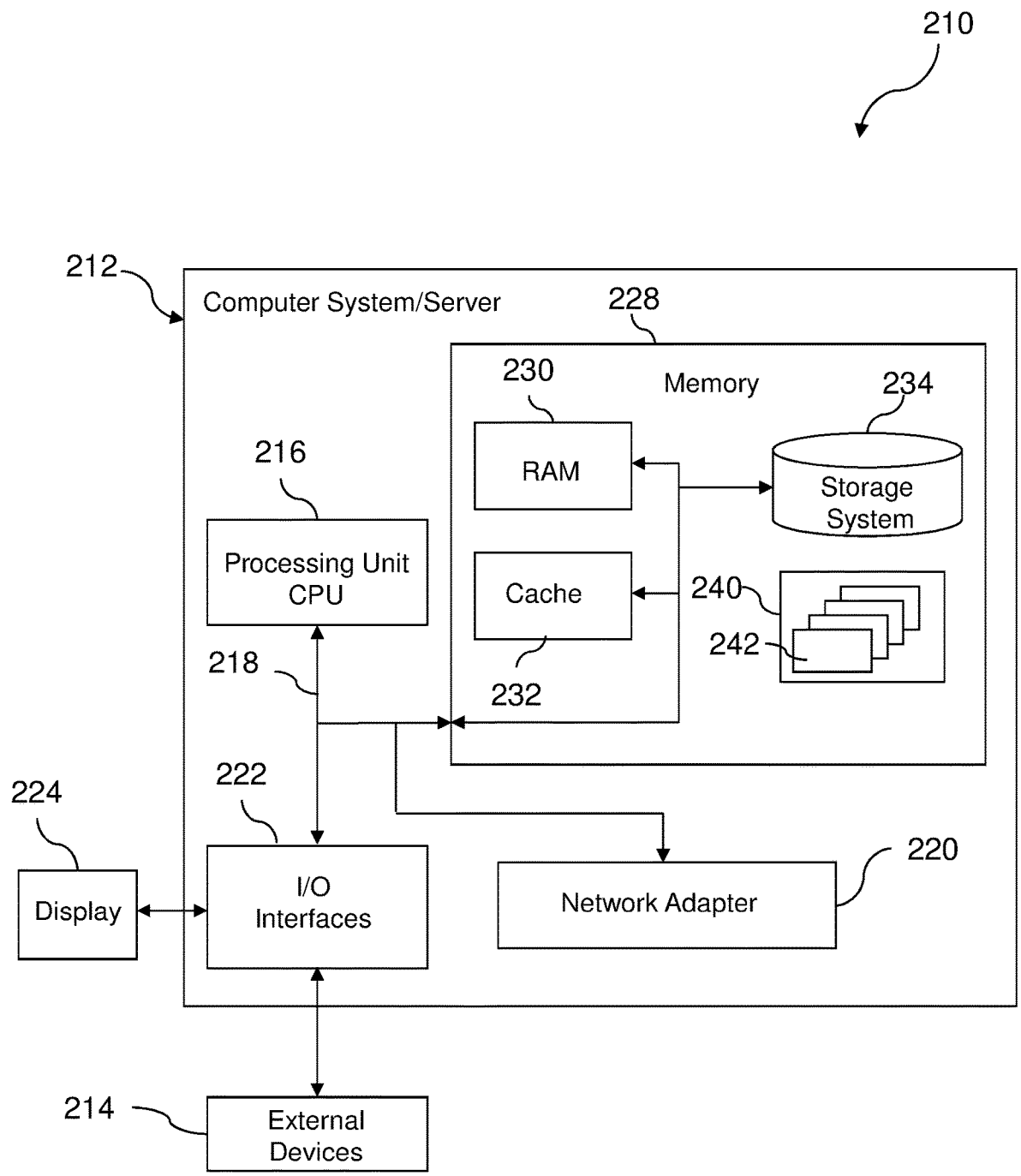
FIG. 9 is a block diagram depicting an example embodiment of a data processing system for executing a method according to the invention.

Referring now to FIG. 9, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, Redundant Array of Independent Disk (RAID) systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
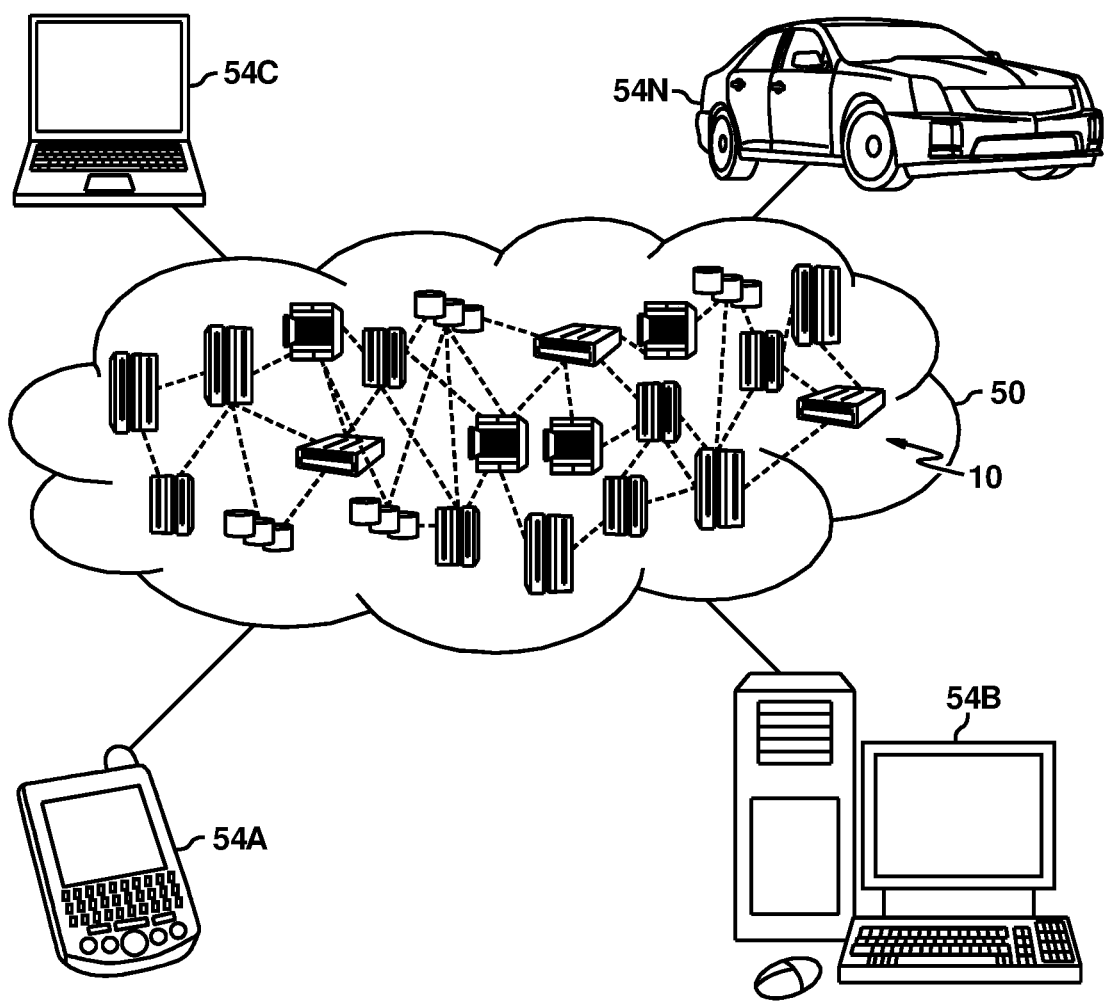
FIG. 10 depicts a cloud computing environment, in accordance with an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 11:
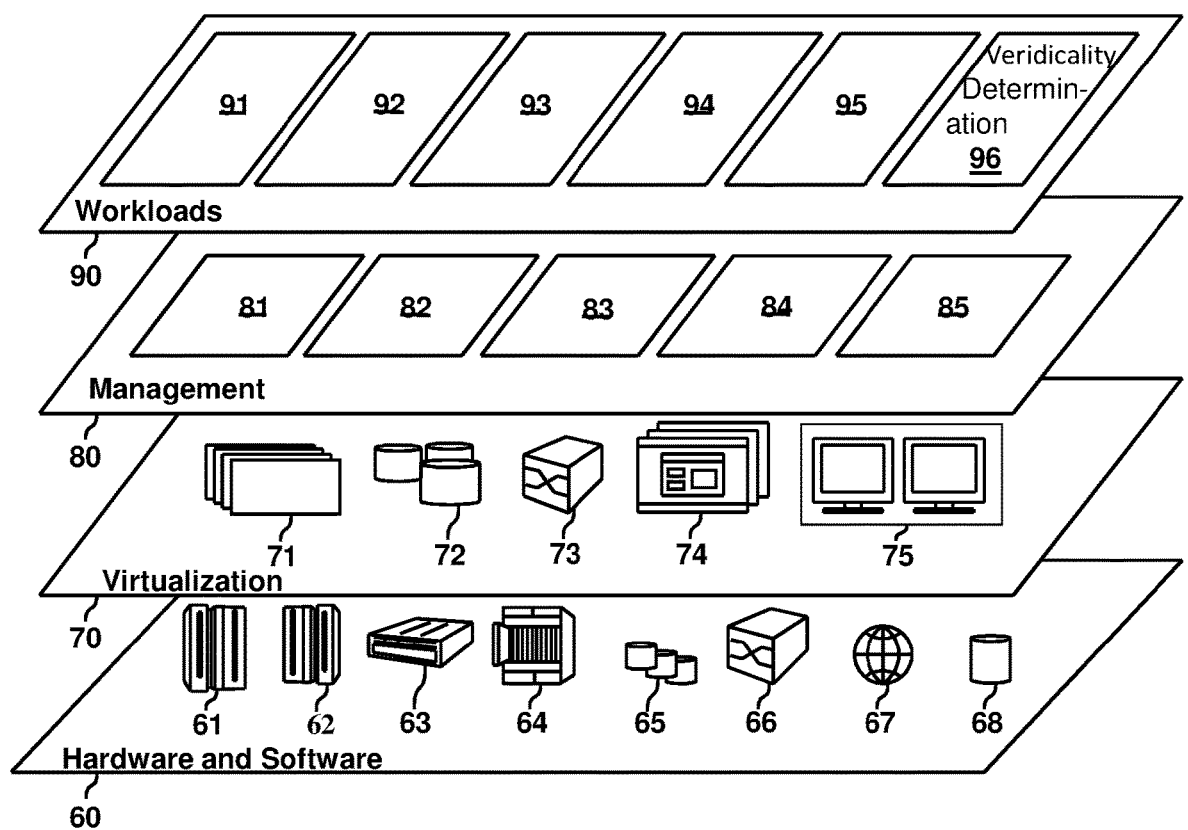
FIG. 11 depicts abstraction model layers, in accordance with an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and veridicality determination 96.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for determining a veridicality metric of a user based on a user profile stored in an electronic information system, the method comprising:

retrieving from the information system elements of the user profile, wherein the elements of the user profile comprise posted contents, a name, a profile photo, and a reference count, wherein the reference count characterizing a number of documents stored in the information system that refer to the user profile;

submitting a search request to at least one further information system, a search criterion of the search request comprising at least a part of the elements;

receiving at least one search result related to the search request;

analyzing, using a logistic regression algorithm or a support vector machine algorithm, the posted contents to construct classification models to determine an age of the user;

determining whether the profile photo is a photo of a person by classifying the profile photo with a visual recognition software;

based on determining the profile photo is the photo of the person determining the veridicality metric based on the age of the user, the profile photo, the elements and the at least one search result;

based on determining the reference count is below a threshold, changing a reference score to zero, wherein the reference score is used in calculating the veridicality metric;

determining an another person having the profile photo with an another name by searching the at least one further information system for the another person having the profile photo, wherein the another person having the profile photo associated with the another name; and based on determining the another person having the profile photo with the another name, changing the veridicality metric to zero.

2. The method according to claim 1, wherein determining the veridicality metric further comprises:

calculating at least one score value based on the elements of the user profile and the at least one search result.

3. The method according to claim 1, wherein determining the veridicality metric further comprises:

calculating a weighted sum of multiple score values, if more than one element is searched, wherein at least one score value is based on the elements of the user profile and the at least one search result.

4. The method according to claim 3, further comprising: weighting the score values of different elements with predefined coefficients attributed to one element each.

5. The method according to claim 1, wherein elements of the user profile comprise a photo and a name associated with the user profile.

6. The method according to claim 5, further comprising: classifying the photo using a visual recognition technique.

7. The method according to claim 1, wherein an element of the user profile comprises a company name.

8. The method according to claim 7, further comprising: verifying the company name using content of a professional network.

9. The method according to claim 1, wherein an element of the user profile comprises an age of an owner of the user profile, the age being retrieved directly from the user profile and/or derived from one or more elements present in the user profile.

10. The method according to claim 9, further comprising: verifying the age of the owner of the user profile using data mining techniques.

11. The method according to claim 1, wherein an element of the user profile comprises an age of the user profile, the age of the user profile being retrieved directly from the user profile and/or derived from timestamps which are associated with one or more elements present in the user profile or are associated with the user profile.

12. The method according to claim 11, further comprising: verifying the age of the user profile based on the timestamps of posted content in a consecutive sequence of years of the user profile.

13. The method according to claim 1, wherein the number of documents comprises posts of other social network users.

14. A computer program product for determining a veridicality metric of a user based on a user profile stored in an electronic information system, the method comprising:

a computer-readable storage device and program instructions stored on computer-readable storage device, the program instructions comprising:

retrieving from the information system elements of the user profile, wherein the elements of the user profile comprise posted contents, a name, a profile photo, and a reference count, wherein the reference count characterizing a number of documents stored in the information system that refer to the user profile;

submitting a search request to at least one further information system, a search criterion of the search request comprising at least a part of the elements;

receiving at least one search result related to the search request;

analyzing, using a logistic regression algorithm or a support vector machine algorithm, the posted contents to construct classification models to determine an age of the user;

determining whether the profile photo is a photo of a person or something other than the person by classifying the profile photo with a visual recognition software;

based on determining the profile photo is the photo of the person, determining the veridicality metric based on the age of the user, the profile photo and the elements and the at least one search result;

based on determining the reference count is below a threshold, changing a reference score to zero, wherein the reference score is used in calculating the veridicality metric;

determining an another person having the profile photo with an another name by searching the at least one further information system for the another person having the profile photo, wherein the another person having the profile photo associated with the another name; and based on determining the another person having the profile photo with the another name, changing the veridicality metric to zero.

15. The computer program product as in claim 14, wherein determining the veridicality metric further comprises:

calculating at least one score value based on the elements of the user profile and the at least one search result.

16. The computer program product as in claim 14, wherein determining the veridicality metric further comprises:

calculating a weighted sum of multiple score values, if more than one element is searched, wherein at least one score value is based on the elements of the user profile and the at least one search result.

17. A computer system for determining a veridicality metric of a user based on a user profile stored in an electronic information system, the system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

a retrieving module configured for retrieving from the information system elements of the user profile, wherein the elements of the user profile comprise posted contents, a name, a profile photo, and a reference count, wherein the reference count characterizing a number of documents stored in the information system that refer to the user profile;

a search module configured for submitting a search request to at least one further information system, a search criterion of the search request comprising at least a part of the element;

a receiving module configured for receiving at least one search result related to the search request;

an analyzing module configured for:

analyzing, using a logistic regression algorithm or a support vector machine algorithm, the posted contents to determine an age of the user; and determining whether the profile photo is a photo of a person or something other than the person by classifying the profile photo with a visual recognition software;

a determining module configured for:

determining the veridicality metric based on determining the profile photo is the photo of the person, wherein the veridicality metric is determined based on the age of the user, the profile photo, the elements, and the at least one search result;

based on determining the reference count is below a threshold, changing a reference score to zero, wherein the reference score is used in calculating the veridicality metric;

determining an another person having the profile photo with an another name by searching the at least one further information system for the another person having the profile photo, wherein the another person having the profile photo associated with the another name; and based on determining the another person having the profile photo with the another name, changing the veridicality metric to zero.

18. The computer system as in claim 17, wherein determining the veridicality metric further comprises:

calculating at least one score value based on the elements of the user profile and the at least one search result.

* * * * *